US006086085A

United States Patent [19]

Larsson

[11] Patent Number: 6,086,085

[45] Date of Patent: Jul. 11, 2000

[54] COMBINATION OF A CAR-SEAT AND A WHEEL CHAIR

[76] Inventor: Walter Larsson, 11 Tanglewood Dr. P.O. Box 425, South Chatham, Mass. 02659

[21] Appl. No.: 09/224,303

[22] Filed: Dec. 31, 1998

Related U.S. Application Data

[60] Provisional application No. 60/071,573, Jan. 15, 1998.

[51] Int. Cl.[7] .............. B62B 1/00

[52] U.S. Cl. .............. 280/648; 280/642; 280/647; 280/304.1; 5/86.1

[58] Field of Search .............. 280/647, 648, 280/650, 642, 304.1, 250.1, 79.2; 5/86.1, 81.1 R; 414/921

[56] References Cited

U.S. PATENT DOCUMENTS

| | | | |
|---|---|---|---|
| 3,170,709 | 2/1965 | Shackel | 280/47.34 |
| 4,010,499 | 3/1977 | Davis et al. | 280/47.38 |
| 4,354,791 | 10/1982 | Antonellis | 414/921 |
| 4,457,663 | 7/1984 | Hems et al. | 414/921 |
| 4,483,653 | 11/1984 | Waite | 414/921 |
| 4,555,121 | 3/1985 | Lockard et al. | 280/648 |
| 4,669,943 | 6/1987 | Zamotin | 414/921 |
| 5,209,322 | 5/1993 | McMahon | 280/304.1 |
| 5,388,289 | 2/1995 | Casperson | 5/81.1 |
| 5,466,111 | 11/1995 | Meyer | 280/250.1 |

*Primary Examiner*—J. J. Swann
*Assistant Examiner*—James S. McClellan

[57] ABSTRACT

A wheelchair device for aiding the positioning of a user into a car seat. The wheelchair device includes a base frame with a plurality of ground engaging wheels. A spaced apart pair of elongate support members are upwardly extended from the base frame. Each of the support members has a tubular lifting sleeve slidably disposed therearound. A lower cross bar is extended between the lifting sleeves. The lifting sleeves each have an elongate side bar forwardly extending from the respective sleeve. A platform is detachably and slidably coupled to the side bars. A lifting device is provided for raising and lowering the platform with respect to the base frame. A seat is detachably and rotationally mounted on the platform.

10 Claims, 2 Drawing Sheets

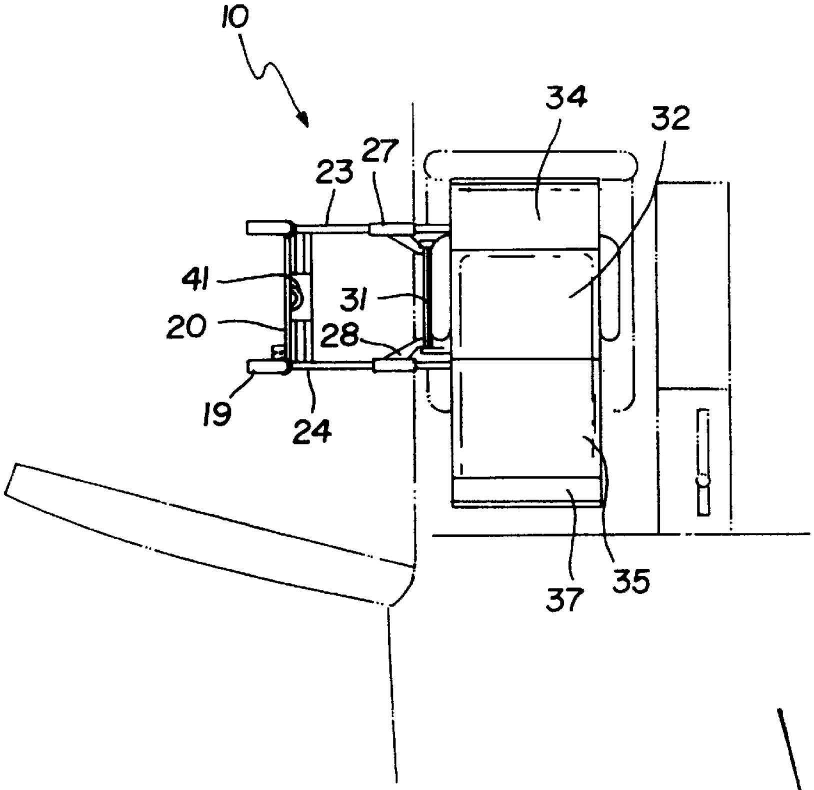
FIG. 2
FIG. 3
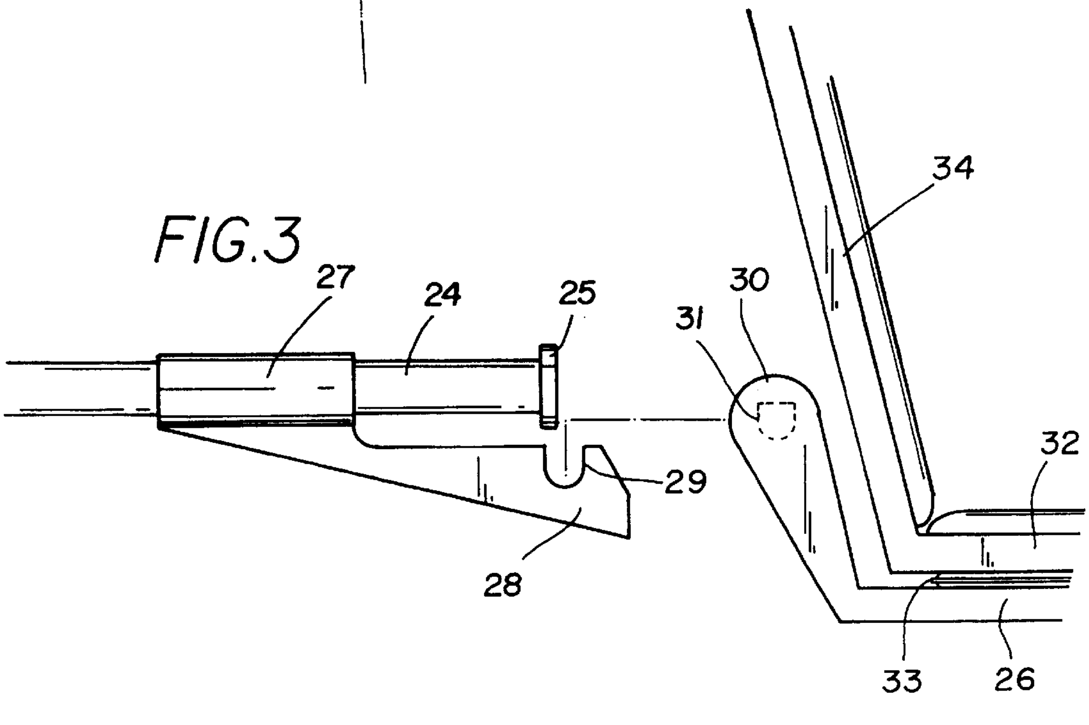

COMBINATION OF A CAR-SEAT AND A WHEEL CHAIR

CROSS REFERENCE TO RELATED APPLICATION

This application claims the benefit of U.S. Provisional Application No. 60/071,573, filed Jan. 15, 1998.

BACKGROUND OF THE INVENTION

1. Field of the Invention

The present invention relates to wheelchairs and more particularly pertains to a new wheelchair device for aiding the positioning of a user into a car seat.

2. Description of the Prior Art

The use of wheelchairs is known in the prior art. More specifically, wheelchairs heretofore devised and utilized arc known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,674,041; U.S. Pat. No. 4,669,943; U.S. Pat. No. 4,354,791; U.S. Pat. No. 5,520,403; U.S. Pat. No. 2,798,565; and U.S. Pat. No. Des. 313,382.

While these devices fulfill their respective, particular objectives and requirements, the aforementioned patents do not disclose a new wheelchair device. The inventive device includes a base frame with a plurality of ground engaging wheels. A spaced apart pair of elongate support members are upwardly extended from the base frame. Each of the support members has a tubular lifting sleeve slidably disposed therearound. A lower cross bar is extended between the lifting sleeves. The lifting sleeves each have an elongate side bar forwardly extending from the respective sleeve. A platform is detachably and slidably coupled to the side bars. A lifting device is provided for raising and lowering the platform with respect to the base frame. A seat is detachably and rotationally mounted on the platform.

In these respects, the wheelchair device according to the present invention substantially departs from the conventional concepts and designs of the prior art, and in so doing provides an apparatus primarily developed for the purpose of aiding the positioning of a user into a car seat.

SUMMARY OF THE INVENTION

In view of the foregoing disadvantages inherent in the known types of wheelchairs now present in the prior art, the present invention provides a new wheelchair device construction wherein the same can be utilized for aiding the positioning of a user into a car seat.

The general purpose of the present invention, which will be described subsequently in greater detail, is to provide a new wheelchair device apparatus and method which has many of the advantages of the wheelchairs mentioned heretofore and many novel features that result in a new wheelchair device which is not anticipated, rendered obvious, suggested, or even implied by any of the prior art wheelchairs, either alone or in any combination thereof.

To attain this, the present invention generally comprises a base frame with a plurality of ground engaging wheels. A spaced apart pair of elongate support members are upwardly extended from the base frame. Each of the support members has a tubular lifting sleeve slidably disposed therearound. A lower cross bar is extended between the lifting sleeves. The lifting sleeves each have an elongate side bar forwardly extending from the respective sleeve. A platform is detachably and slidably coupled to the side bars. A lifting device is provided for raising and lowering the platform with respect to the base frame. A seat is detachably and rotationally mounted on the platform.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheelchair device apparatus and method which has many of the advantages of the wheelchairs mentioned heretofore and many novel features that result in a new wheelchair device which is not anticipated, rendered obvious, suggested, or even implied by any of the prior art wheelchairs, either alone or in any combination thereof.

It is another object of the present invention to provide a new wheelchair device which may be easily and efficiently manufactured and marketed.

It is a further object of the present invention to provide a new wheelchair device which is of a durable and reliable construction.

An even further object of the present invention is to provide a new wheelchair device which is susceptible of a low cost of manufacture with regard to both materials and labor, and which accordingly is then susceptible of low prices of sale to the consuming public, thereby making such wheelchair device economically available to the buying public.

Still yet another object of the present invention is to provide a new wheelchair device which provides in the apparatuses and methods of the prior art some of the advantages thereof, while simultaneously overcoming some of the disadvantages normally associated therewith.

Still another object of the present invention is to provide a new wheelchair device for aiding the positioning of a user into a car seat.

Yet another object of the present invention is to provide a new wheelchair device which includes a base frame with a plurality of ground engaging wheels. A spaced apart pair of elongate support members are upwardly extended from the base frame. Each of the support members has a tubular lifting sleeve slidably disposed therearound. A lower cross bar is extended between the lifting sleeves. The lifting sleeves each have an elongate side bar forwardly extending from the respective sleeve. A platform is detachably and slidably coupled to the side bars. A lifting device is provided for raising and lowering the platform with respect to the base frame. A seat is detachably and rotationally mounted on the platform.

Still yet another object of the present invention is to provide a new wheelchair device that has a detachable seat that may be positioned over a car seat to position a user on the car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic top view of the present invention in use illustrating is position when moving a user to and from a scat of a vehicle. The seat is rotated 90 degrees to be aligned with the scat of the vehicle to properly position the scat on the seat of the vehicle.

FIG. 3 is a schematic enlarged exploded view of the coupling of the platform to a side bar of the present invention.

DESCRIPTION OF THE PREFERRED EMBODIMENT

Figure 1:
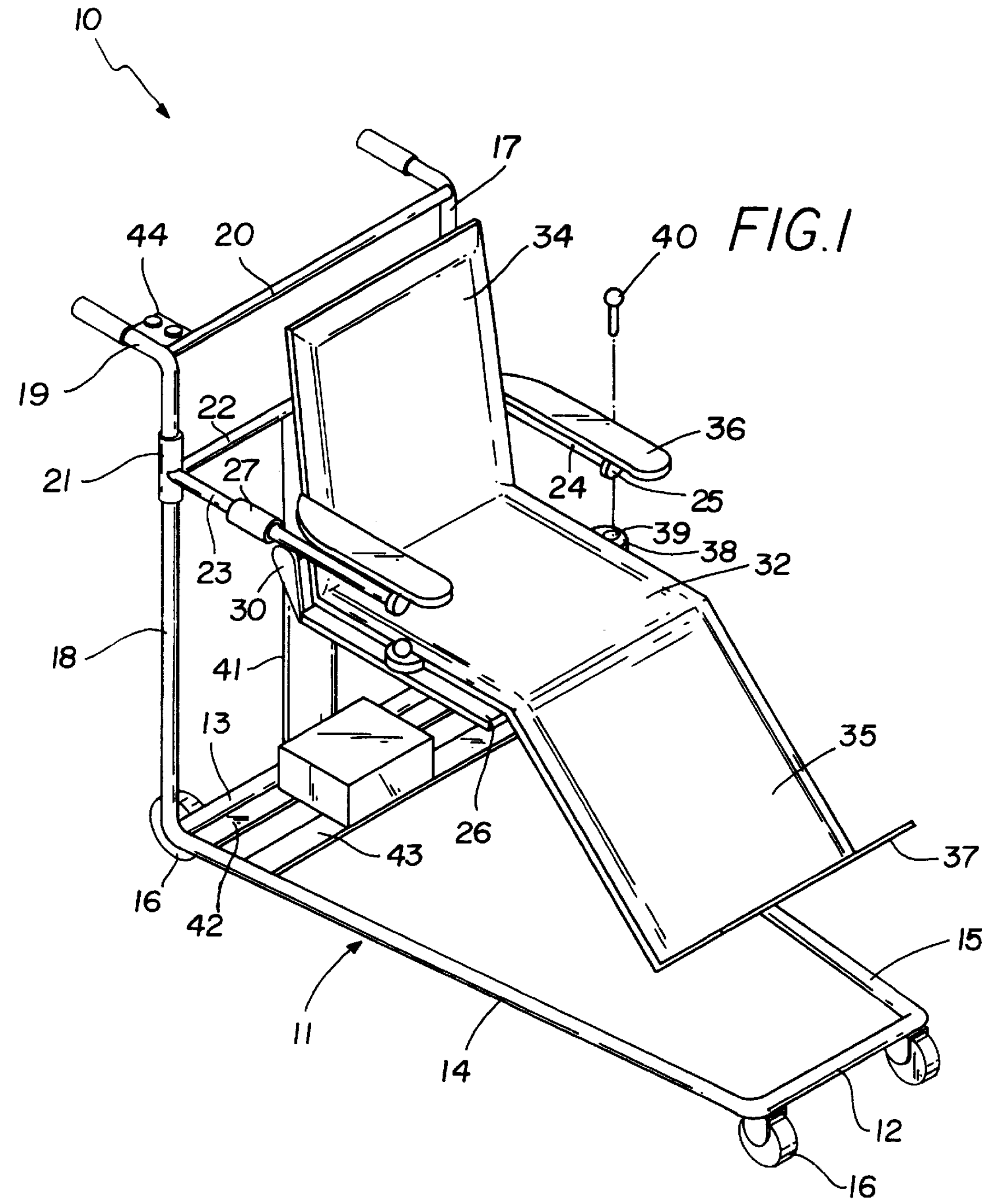
FIG. 1 is a schematic front perspective view of a new wheelchair device according to the present invention.

With reference now to the drawings, and in particular to FIGS. 1 through 3 thereof, a new wheelchair device embodying the principles and concepts of the present invention and generally designated by the reference numeral 10 will be described.

As best illustrated in FIGS. 1 through 3, the wheelchair device 10 generally comprises a base frame with a plurality of ground engaging wheels. A spaced apart pair of elongate support members are upwardly extended from the base frame. Each of the support members has a tubular lifting sleeve slidably disposed therearound. A lower cross bar is extended between the lifting sleeves. The lifting sleeves each have an elongate side bar forwardly extending from the respective sleeve. A platform is detachably and slidably coupled to the side bars. A lifting device is provided for raising and lowering the platform with respect to the base frame. A seat is detachably and rotationally mounted on the platform.

In closer detail, the wheelchair device 10 comprises a generally trapezoidal open base frame 11 having elongate front and back end members 12,13, and a pair of elongate side members 14,15 extending between the front and back members. Ideally, the end and side members of the base frame are each tubular. The length of the back end member is greater than the length of the front end member so that the side members converge toward one another in a direction towards the front end member. The base frame has a plurality of ground engaging wheels 16 for permitting rolling of the base frame over a ground surface. The wheels of the base frame are preferably swivelably mounted to the base frame with a first pair of the wheels coupled to the front end member and a second pair of the wheels is coupled to the back end member.

A spaced apart pair of elongate support members 17,18 are upwardly extended from the base frame adjacent the back end member of the base frame. One of the support members is positioned adjacent one of the side members of the base frame and the other of the support members is positioned adjacent the other side member of the base frame. Preferably, the support members are extended substantially parallel to on another and substantially perpendicular to the plane in which the base frame lies. Ideally, the support members are substantially vertical.

Each of the support members has a handle 19 outwardly extending from an upper end of the respective support member. The handles are outwardly extended in a direction away from the base frame and substantially perpendicular to the associated support member.

An elongate upper cross member 20 is extended between the upper ends of the support members for added structural strength. The upper cross member is extended substantially perpendicular to the support members.

The support members each have a tubular lifting sleeve 21 slidably disposed therearound to permit sliding of each lifting sleeve along the respective support member. An elongate lower cross bar 22 is extended between the lifting sleeves substantially perpendicular to the support members. The lifting sleeves each have an elongate side bar 23,24 forwardly extending from the respective sleeve in a direction towards the front end member of the base frame. The side bars of the sleeve are extended substantially parallel to one another and substantially perpendicular to the support members and to the lower cross bar. Ideally, the side bars and the lower cross bar generally lie in a common horizontal plane. Each of the side bars terminates at a free end opposite the associated lifting sleeve. Each of the side bars has a disk-shaped stop 25 at the free end of the respective side bar.

A generally rectangular platform 26 is detachably and slidably coupled to the side bars to permit sliding of the platform along the side bars between the support members and the stops of the side bars. In a preferred embodiment, each of the side bars each has a tubular sliding sleeve 27 slidably disposed around the respective side bar to permit sliding of each sliding sleeve along the respective side bar between the associated lifting sleeve and stop. As best illustrated in FIG. 3, each of the sliding sleeve has a mounting bracket 28 coupled thereto. The mounting brackets are positioned below the associated adjacent side bar. Each of the mounting brackets has an upwardly facing generally U-shaped upper notch 29.

The platform has substantially planar upper and lower faces, front and back edges and a pair of side edges extending between the front and back edges. The front edge of the platform is positioned towards the front end member of the base frame and the back edge of the platform is positioned towards the back end member of the base frame. The platform has a spaced apart pair of upwardly extending hanging arms 30 at the back edge of the platform. One of the hanging arms is positioned adjacent of the side edges of the platform. The other of the hanging arms is positioned adjacent the other side edge of the platform.

An elongate hanging bar 31 is extended between the hanging arms. The hanging bar and the upper face of the hanging bar preferably lie in substantially parallel planes to one another. The hanging bar is extended through the upper notches of the mounting brackets. Ideally, the hanging bar stops (such as has a generally U-shaped transverse cross section) for engaging side walls of the upper notches to prevent pivoting of the platform on the mounting brackets and to maintain the platform in a horizontal plane when attached to the mounting brackets.

A seat 32 is detachably and rotationally mounted on the upper face of the platform to permit rotation of the seat about a generally vertical axis perpendicular to the upper face of the platform. Preferably, the upper face of the platform has a bearing 33 thereon on to which the seat is detachably mounted. In use, the bearing permits rotation of the scat with respect to the platform. The seat has an upwardly extending backrest 34 and a downwardly depending leg rest 35. Preferably, the backrest is extended at an obtuse angle to the seat and the leg rest is extended at an obtuse angle to the seat. The backrest has a pair of forwardly extending arm rests 36. Optionally, one of the arm rests may be rested on one of the side bars and the other of the arm rests is rested on the other of the side bars. The leg rest has a foot rest 37 forwardly extending therefrom.

The seat has a pair of side tabs 38 outwardly extending therefrom. Each of the side tabs has a hole 39 therethrough. The upper face of the platform also has a pair of holes therein. Each hole of the platform is positioned generally coaxial with the hole of an associated adjacent side tab. Each of the side tabs has securing pin 40 removably extending through the hole of the respective side tab into the associated hole of the platform to releasably hold the seat against rotation of the platform.

A lifting device is provided for raising and lowering the platform with respect to the base frame. The lifting device preferably comprises a telescopically extendable fluidic piston-cylinder actuator 41 (such as a hydraulic ram) extending between the base frame and the cross bar. The base frame has a pair of supports 42,43 extending between the side members of the base frame. The fluidic piston-cylinder actuator is mounted on the supports of the base frame with an upper end of the fluidic piston-cylinder actuator coupled to the lower cross bar. In use, the fluidic piston-cylinder actuator is telescopically extendable to selectively raise and lower the cross bar to raise and lower the platform. Preferably, the fluidic piston-cylinder actuator has a controller 44 for controlling extension of the fluidic piston-cylinder actuator to raise and lower the platform. The controller may be coupled to one of the handles as illustrated in FIG. 1 or the controller may be coupled to one of the arm rests to permit a user sitting on the seat to control the raising and lowering of the platform.

In use a user sits on the seat. The wheelchair device is then positioned adjacent an open door of a vehicle so that the front end of the base frame is positioned beneath the vehicle. The platform is positioned so that the seat is positioned about the seat of the vehicle. The seat is then rotated to be properly aligned over the seat of the vehicle. The seat and the platform may then be removed to rest on the seat of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheelchair device, comprising:

a base frame having front and back end members, and a pair of side members extending between said front and back members;

said base frame having a plurality of ground engaging wheels;

a spaced apart pair of elongate support members being upwardly extended from said base frame adjacent said back end member of said base frame, one of said support members being positioned adjacent one of said side members of said base frame, the other of said support members being positioned adjacent the other side member of said base frame;

each of said support members having a handle outwardly extending therefrom;

said support members each having a tubular lifting sleeve slidably disposed therearound;

a lower cross bar being extended between said lifting sleeves;

said lifting sleeves each having an elongate side bar forwardly extending from the respective sleeve;

a platform being detachably and slidably coupled to said side bars;

a lifting device for raising and lowering said platform with respect to said base frame; and a seat being detachably and rotationally mounted on said platform.

2. The wheelchair device of claim 1, wherein said side members converge toward one another in a direction towards said front end member.

3. The wheelchair device of claim 1, wherein a first pair of said wheels are coupled to said front end member, a second pair of said wheels are coupled to said back end member.

4. The wheelchair device of claim 1, further comprising an upper cross member being extended between upper ends of said support members.

5. The wheelchair device of claim 1, wherein said side bars each have a tubular sliding sleeve slidably disposed around the respective side bar, each of said sliding sleeve having a mounting bracket coupled thereto, each of said mounting brackets having an upper notch, said platform having a spaced apart pair of upwardly extending hanging arms, an elongate hanging bar being extended between said hanging arms, said hanging bar being extended through said upper notches of said mounting brackets.

6. The wheelchair device of claim 5, wherein each of said side bars terminates at a free end opposite the associated lifting sleeve, each of said side bars having a disk-shaped stop at said free end of the respective side bar.

7. The wheelchair device of claim 1, wherein said seat has an upwardly extending backrest and a downwardly depending leg rest.

8. The wheelchair device of claim 1, wherein said lifting device comprises a telescopically extendable fluidic piston-cylinder actuator extending between said base frame and said cross bar.

9. The wheelchair device of claim 8, wherein said base frame has a pair of supports extending between said side members of said base frame, said fluidic piston-cylinder actuator being mounted on said supports of said base frame.

10. wheelchair device, comprising:

a generally trapezoidal open base frame having elongate front and back end members, and a pair of elongate side members extending between said front and back members, wherein said end and side members of said base frame are each tubular;

said side members converging toward one another in a direction towards said front end member;

said base frame having a plurality of ground engaging wheels, said wheels of said base frame being swivelably mounted to said base frame, a first pair of said wheels being coupled to said front end member, a second pair of said wheels being coupled to said back end member;

a spaced apart pair of elongate support members being upwardly extended from said base frame adjacent said back end member of said base frame, one of said support members being positioned adjacent one of said side members of said base frame, the other of said support members being positioned adjacent the other side member of said base frame;

said support members being extended substantially parallel to on another and substantially perpendicular to said base frame, wherein said support members are substantially vertical;

each of said support members having a handle outwardly extending from an upper end of the respective support member, said handles being outwardly extended in a direction away from said base frame and substantially perpendicular to the associated support member;

an elongate upper cross member being extended between said upper ends of said support members, said upper cross member being extended substantially perpendicular to said support members;

said support members each having a tubular lifting sleeve slidably disposed therearound;

an elongate lower cross bar being extended between said lifting sleeves substantially perpendicular to said support members;

said lifting sleeves each having an elongate side bar forwardly extending from the respective sleeve in a direction towards said front end member of said base frame;

said side bars of said sleeve being extended substantially parallel to one another;

said side bars being extended substantially perpendicular to said support members and substantially perpendicular to said cross bar;

said side bars and said cross bar generally lying in a common horizontal plane;

each of said side bars terminating at a free end opposite the associated lifting sleeve, each of said side bars having a disk-shaped stop at said free end of the respective side bar;

a generally rectangular platform being detachably and slidably coupled to said side bars to permit sliding of said platform along said side bars between said support members and said stops of said side bars;

said side bars each having a tubular sliding sleeve slidably disposed around the respective side bar to permit sliding of each sliding sleeve along the respective side bar between the associated lifting sleeve and stop;

each of said sliding sleeve having a mounting bracket coupled thereto, said mounting brackets being positioned below the associated adjacent side bar, each of said mounting brackets having a generally U-shaped upper notch;

said platform having upper and lower faces, front and back edges and a pair of side edges extending between said front and back edges, said front edge of said platform being positioned towards said front end member of said base frame, said back edge of said platform being positioned towards said back end member of said base frame;

said platform having a spaced apart pair of upwardly extending hanging arms at said back edge of said platform, one of said hanging arms being positioned adjacent of said side edges of said platform, the other of said hanging arms being positioned adjacent the other side edge of said platform;

an elongate hanging bar being extended between said hanging arms, said hanging bar and said upper face of said hanging bar lying in substantially parallel planes to one another;

said hanging bar being extended through said upper notches of said mounting brackets;

a seat being detachably and rotationally mounted on said upper face of said platform to permit rotation of said seat about a generally vertical axis perpendicular to said upper face of said platform;

said seat having an upwardly extending backrest and a downwardly depending leg rest, said backrest being extended at an obtuse angle to said scat, said leg rest being extended at an obtuse angle to said seat;

said backrest having a pair of forwardly extending arm rests;

said leg rest having a foot rest forwardly extending therefrom;

said scat having a pair of side tabs outwardly extending therefrom, each of said side tabs having a hole therethrough;

said upper face of said platform having a pair of holes therein, each hole of said platform being positioned generally coaxial with the hole of an associated adjacent side tab;

each of said side tabs having securing pin extending through the hole of the respective side tab into the associated hole of said platform to hold said seat against rotation of said platform;

a lifting device for raising and lowering said platform with respect to said base frame, said lifting device comprising a telescopically extendable fluidic piston-cylinder actuator extending between said base frame and said cross bar; and said base frame having a pair of supports extending between said side members of said base frame, said fluidic piston-cylinder actuator being mounted on said supports of said base frame.

* * * * *